UNITED STATES PATENT OFFICE.

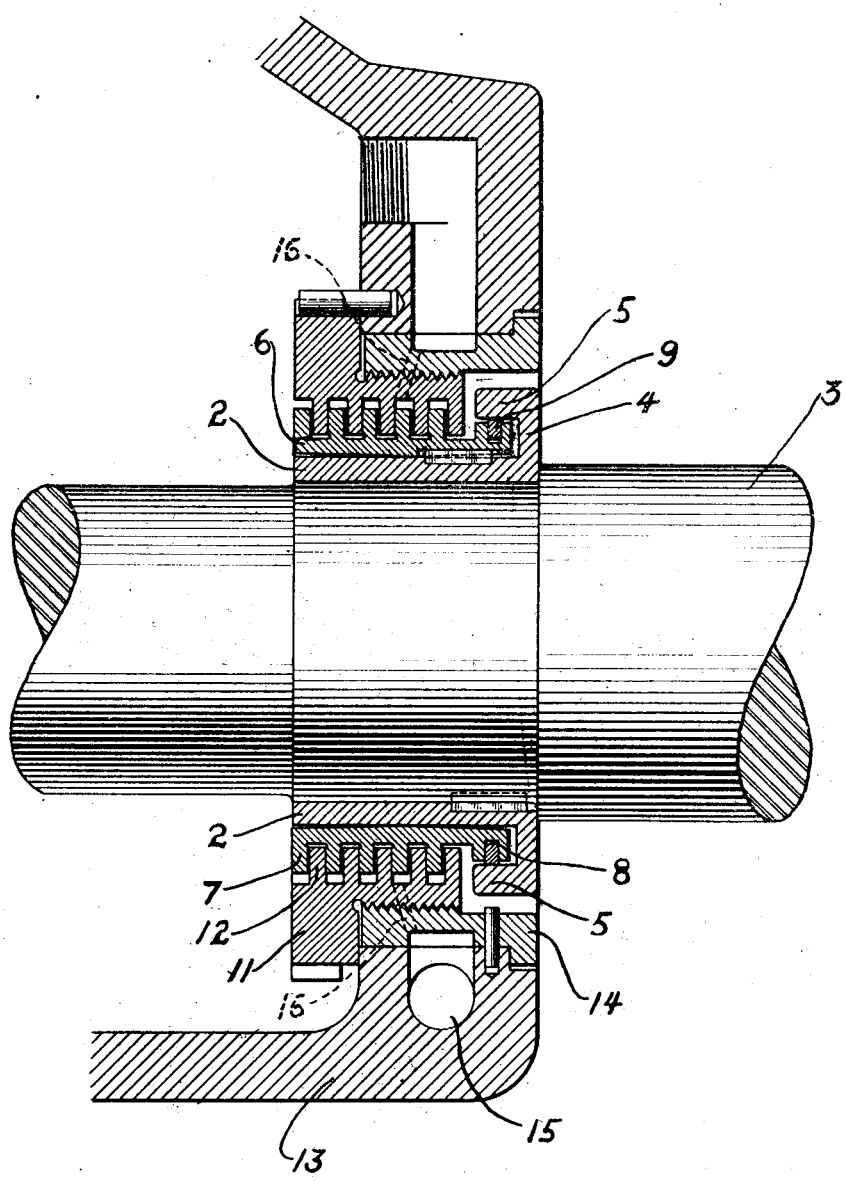

GEORGE WESTINGHOUSE, OF PITTSBURGH, PENNSYLVANIA, ASSIGNOR TO THE WESTINGHOUSE MACHINE COMPANY, OF EAST PITTSBURGH, PENNSYLVANIA, A CORPORATION OF PENNSYLVANIA.

GLAND-PACKING.

1,187,212.  Specification of Letters Patent.  Patented June 13, 1916.

Application filed August 20, 1913. Serial No. 785,734.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Gland-Packing, of which the following is a specification.

An object of this invention is to produce a new and improved gland packing, which is capable of forming a steam or air-tight joint between a rapidly rotating shaft and a stationary casing or stationary element through which the shaft projects. This, as well as other objects, which will readily appear to those skilled in the art, I attain by means of packing embodying the features herein described and illustrated in the drawings accompanying and forming a part of this application.

In the drawings I have illustrated a sectional view of a packing in connection with a fragmental elevation of a turbine shaft, and a fragmental sectional view of a turbine casing through an opening in which the shaft projects.

The packing illustrated includes a ring shape bushing 2, rigidly mounted on the shaft 3, and which is provided with an outwardly projecting annular flange 4. The flange 4 is L shape in cross section, terminating in a cylindrical portion 5, which is concentric with the body of the bushing and overhangs it. A sleeve 6 is mounted on the bushing 2 and is provided on its outer cylindrical face with a series of circumferentially extending and outwardly projecting annular flanges or leaves 7, which are preferably spaced equal distances apart and are similar to each other in form. The inner or casing end of the sleeve 6 is provided with a shoulder 8, and the sleeve is adapted to be so located on the bushing that the shoulder is surrounded by the overhanging portion 5 of the flange 4. The shoulder is also grooved to receive at least one circumferentially extending packing ring 9, mounted on the sleeve, which is yieldingly forced outwardly and into engagement with the inner cylindrical face of the portion 5, and forms therewith an air or steam-tight fit. A ring 11 surrounds the sleeve 6 and is provided on its inner cylindrical face with inwardly projecting, circumferentially extending leaves or flanges 12, which interleave with the leaves or flanges 7 and coöperate therewith to form a labyrinth packing between the shaft 3 and the casing 13, through which the shaft extends. It will be understood that the leaves 12 are substantially similar to the leaves 7 and that they are correspondingly spaced along the ring 11.

For the purpose of ease in assembling, the ring 11 is preferably cut longitudinally; that is, is formed in semi-circular halves which may be secured together in any suitable manner after they are located in position around the sleeve 6. As illustrated, the ring 11 is threaded into a ring 14, which is shown rigidly mounted on the casing 13, and which will operate to hold the separate parts of the ring 11 together even though no other means are employed for that purpose.

The packing is assembled substantially as follows: The bushing 2 is rigidly mounted on the shaft 3 in such a position that its flanged end is exposed to interior pressures of the casing, when the shaft is in its normal position with relation to the bushing. The bushing, however, is rigidly mounted on the shaft prior to locating the shaft in position relatively to the casing, and the sleeve 6 is also located on the shaft, but it is not positioned with relation to the bushing. The ring 14 is preferably, but not necessarily, formed in one piece and is also placed around the shaft 3 so that it can be conveniently mounted in place after the shaft is moved to its proper position relatively to the casing. After the shaft is in this position and the ring 14 is rigidly secured to the casing, the two parts of the ring 11 are secured together about the sleeve 6, with the leaves or flanges 12 in the proper coöperative position with relation to the leaves or flanges 7. The sleeve 6 is then moved on to the bushing 2 and is slid into place as the ring 11 is screwed into the ring 14. It is, of course, understood that the packing ring 9 is first mounted in the groove formed for its reception in the shoulder 8 of the sleeve and that it moves into engagement with the inner cylindrical face of the portion 5 of the flange 4, and forms therewith an air-tight joint.

Turbine casings are ordinarily divided along the horizontal plane passing through the axis of the rotor element inclosed within the casing, so that access may be had to the interior of the casing without disturbing the alinement of the rotor element. When a packing forming an embodiment of my invention is employed with a casing so divided, the operation of assembling the packing is materially simplified, as will be apparent to those skilled in the art, since the separate halves of the ring 11 can be located in place on the separate halves of the casing with their line of division coinciding with the line of division of the casing. With such an arrangement, the sleeve 6 may be located in the proper position on the bushing 2 prior to moving the shaft 3 into place with relation to the casing and the separate halves of the ring 11 can be moved into place with relation to the shaft at any time prior to locating the upper half or cover of the casing in place on the lower half. It will be apparent, however, that the tapped ring 14 provides a means for adjusting the position of the ring 11 and consequently of the sleeve 6 after the packing is assembled.

While the sleeve 6 is so constructed and arranged that it rotates with the bushing on which it is mounted, it is also arranged to permit air pressure to be transmitted between it and the bushing, and it is also so formed that it will move axially with relation to the bushing in response to a preponderance in one direction or the other of the opposing air pressures to which its opposite ends are subjected. With this arrangement the leaves 7 are moved into engagement with the lateral faces of the leaves 12, and are held in place against them with sufficient force to form an air or steam-tight joint, which operates to effectively pack the joint between the shaft and the casing without materially increasing the friction of rotation of the shaft.

I also find it desirable to so form the inner cylindrical face of the sleeve that the internal diameter of the sleeve is greater at each end than it is midway between the ends, as is shown somewhat diagrammatically in the drawings. With this arrangement the sleeve is capable of tilting and of automatically adjusting itself to correct any existing misalinement between the shaft and the bore in the casing.

In the drawings I have illustrated a packing located between the rotating shaft of the turbine and the turbine casing, and when the packing is so employed the flanged end of the bushing 2 will, under operating conditions, be subjected to condenser pressure since it will, in effect, extend into the interior of the casing. The labyrinth packing, formed by the interleaving flanges 7 and 12, is subjected on one side to atmospheric pressure and on the other side to condenser pressure, but both ends of the sleeve 6 are subjected to atmospheric pressure. The opposite ends of the sleeve are, however, so proportioned that the air pressure on the sleeve in one direction preponderates a slight amount over that in the other, and consequently operates to shift the sleeve in the direction of its preponderation. In the packing illustrated the areas of the opposite ends of the sleeve 6 are so proportioned that the pressure on the inner end preponderates over the pressure exerted on the outer end and consequently the sleeve is moved outwardly so that the outer lateral faces of the flanges 7 are moved and held in engagement with the inner lateral faces of the flanges 12 on the ring 11. It is immaterial whether the inner or outer air pressure preponderates, so long as one does preponderate. It is, however, important to so proportion the end areas of the sleeve that the preponderance of the air pressure will not be too great, or, in other words, the end areas of the sleeve should be so proportioned that the opposing pressures will be just unbalanced, since it is important to maintain an unbalanced longitudinal pressure on the sleeve, which will maintain an air-tight fit between the flanges 7 and 12, but will permit the flanges to slide freely upon each other.

One of the advantages resulting from my invention is that the position of the sleeve 6 will automatically adjust itself to take up wear on the flanges, and that the preponderance of pressure actuating the sleeve 6 will vary in direct ratio with variations in the difference between the pressures to which the opposite ends of the packing are subjected, so that it will hold the interleaving flanges into more intimate engagement with each other when there is a relatively great difference in the pressures inside and outside the casing, than when the pressures to which the opposite ends of the packing are subjected are more nearly equal. Under such conditions the gland will automatically adjust itself for varying internal casing pressures and will effectively pack all pressures with a minimum increase of friction. The sleeve 6 rotates with the shaft and consequently there is no difficulty in maintaining an air or steam-tight joint between it and the portion 5 of the flange 4, by means of the packing ring 9.

In the drawings I have shown means for delivering lubricant to the packing if it is found that lubricant is necessary. The means illustrated consists of a passage 15 provided in the casing 13 which communicates with the interleaving flanges through one or more passages 16 and to which lubricant may be delivered.

It will be understood that a packing will be employed at each end of the turbine casing, and that, inasmuch as the two packings are subjected to similar conditions, they will preferably be similar in construction.

It will also be apparent that packings embodying my invention can be employed in connection with shafts other than turbine shafts and that they may be employed in packing against relatively great differences in pressure and that the opposite ends of the shiftable sleeve 6 may be subjected to relatively high fluid pressure instead of atmospheric pressure.

It will also be understood that while, in accordance with the requirements of the patent statutes, I have illustrated what I now consider to be the preferred embodiment of my invention, various changes, modifications, substitutions and omissions may be made in the apparatus illustrated without departing from the spirit and scope of my invention as set forth in the appended claims.

Having thus described my invention, what I claim is:

1. A labyrinth packing, comprising two elements, one fixed and one floating, said floating element being subjected to the same source of pressure on opposite ends, and being so proportioned that the pressure on one end will preponderate in effect over the pressure on the other end.

2. In a packing, two relatively movable coöperating members, one of said members being subjected on opposite ends to pressure transmitted from the same source and having its end areas so proportioned that the pressure on one end preponderates over the pressure on the other end.

3. In a packing, a longitudinally movable contact sleeve subjected on opposite ends to pressure from the same source and so proportioned that the pressure on one end preponderates over the pressure on the other end.

4. In a labyrinth packing, two concentric sleeves having coöperating flanges formed thereon, one of said sleeves being movable axially with relation to the other to move said flanges into engagement with each other, said movable sleeve being subjected on opposite ends to pressure from the same source and being so formed that the pressure on one end preponderates over the pressure on the other end and operates to hold the flanges of one sleeve in engagement with the flanges of the other sleeve.

5. A packing comprising two elements, one being subjected on opposite ends to pressure from the same source and being held against the other element by a preponderance of the fluid pressure on one end.

6. A labyrinth packing comprising two flanged sleeves located concentrically with relation to each other, and with the flanges of one sleeve interleaving with the flanges of the other sleeve, and means for subjecting both ends of one sleeve to the pressure to which one side of said packing is subjected.

7. A labyrinth packing comprising two flanged sleeves, located concentrically with relation to each other, and with the flanges of one sleeve interleaving with the flanges of the other, one sleeve being movable axially with relation to the other and being subjected on opposite ends to equal fluid pressures, but having its end areas so proportioned that the pressure in one direction preponderates over the pressure in the other direction.

8. A labyrinth packing comprising two flanged sleeves, located concentrically with relation to each other, and with the flanges of one sleeve interleaving with the flanges of the other sleeve, one of said sleeves being adjustably mounted on a relatively stationary member, and one being movable in response to fluid pressure, said movable sleeve being subjected on opposite ends to the fluid pressure on one side of the packing and having its ends so proportioned that the fluid pressure on one end of the packing preponderates over that of the other end and holds the interleaving flanges in packing engagement with each other.

9. In combination in a gland packing, a rotatable bushing, a relatively stationary member surrounding the bushing, two concentric flanged sleeves located between the bushing and said member, with the flanges of one sleeve interleaving with the flanges of the other, one of said sleeves being adjustably mounted on said relatively stationary member, and the other of said sleeves being mounted on the bushing and movable longitudinally therealong, said movable sleeve being subjected on opposite ends to atmospheric pressure and being so proportioned that the atmospheric pressure on one end preponderates over the pressure on the other end.

10. In combination in a gland packing, a rotatable bushing having an L-shaped flange formed on one end thereof, a sleeve mounted on the bushing and movable longitudinally thereof, a packing ring between one end of the sleeve and the L-shape flange of the bushing, a ring surrounding the sleeve and having a plurality of circumferentially extending flanges which interleave with circumferentially extending flanges formed on the sleeve.

11. In a gland packing, a rotatable bushing mounted on the shaft to be packed and having a flange formed on one end thereof, a stationary member surrounding the bushing, a sleeve mounted on the bushing and subjected on each end to pressure from the same source, a packing ring located between the sleeve and the flange formed on the bushing, a flanged ring surrounding the sleeve and having a plurality of circumferentially extending flanges which interleave with circumferentially extending flanges formed on the sleeve, and means for adjustably mounting said ring on said stationary member.

12. In a gland packing, a rotatable bushing, a flanged sleeve mounted on said bushing and movable longitudinally thereof, said sleeve being subjected on opposite ends to the same fluid pressure and having its end areas so proportioned that the pressure on one end preponderates over the pressure on the other, a flanged ring surrounding the sleeve and having its flanges interleaving with the flanges of the sleeve, and means for introducing lubricant to the interleaving flanges of the sleeve and the ring.

In testimony whereof, I have hereunto subscribed my name this 14th day of August, 1913.

GEO. WESTINGHOUSE.

Witnesses:
C. W. McGHEE,
E. W. McCALLISTER.